US010525842B2

United States Patent
Rönfanz et al.

(10) Patent No.: US 10,525,842 B2
(45) Date of Patent: Jan. 7, 2020

(54) LAND-BASED ELECTRIC VEHICLE CHARGING PLUG

(71) Applicant: Dr. Ing. h.c. F. Porsche Aktiengesellschaft, Stuttgart (DE)

(72) Inventors: Jari Rönfanz, Stuttgart (DE); Volker Reber, Michelbach an der Bilz (DE); Stefan Götz, Forstern (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 16/244,353

(22) Filed: Jan. 10, 2019

(65) Prior Publication Data
US 2019/0217729 A1    Jul. 18, 2019

(30) Foreign Application Priority Data

Jan. 16, 2018  (DE) .................. 10 2018 100 824

(51) Int. Cl.
| | |
|---|---|
| *B60L 53/16* | (2019.01) |
| *H01R 31/06* | (2006.01) |
| *H01R 4/30* | (2006.01) |
| *H01R 13/434* | (2006.01) |
| *H01R 13/514* | (2006.01) |
| *H01R 13/53* | (2006.01) |
| *H01R 13/621* | (2006.01) |

(52) U.S. Cl.
CPC .............. *B60L 53/16* (2019.02); *H01R 4/307* (2013.01); *H01R 13/434* (2013.01); *H01R 13/514* (2013.01); *H01R 13/53* (2013.01); *H01R 31/06* (2013.01); *H01R 13/6215* (2013.01); *H01R 2201/26* (2013.01)

(58) Field of Classification Search
CPC .... H01R 13/434; H01R 13/514; H01R 13/53; H01R 24/76; B60L 53/16
USPC ............................................. 439/34
See application file for complete search history.

(56) References Cited

U.S. PATENT DOCUMENTS

| | | | |
|---|---|---|---|
| 5,536,173 A * | 7/1996 | Fujitani | H01R 13/641 439/34 |
| 7,226,322 B2 | 6/2007 | Schuldt | |
| 8,702,449 B2 | 4/2014 | Provost et al. | |
| 9,853,389 B2 | 12/2017 | Kuhlefelt | |
| 2013/0224969 A1* | 8/2013 | Sasaki | H01R 31/06 439/34 |
| 2017/0279210 A1* | 9/2017 | Kraemer | H01R 13/506 |

FOREIGN PATENT DOCUMENTS

| | | |
|---|---|---|
| CN | 105896212 A | 8/2016 |
| CN | 106785545 A | 5/2017 |
| DE | 69306455 T2 | 5/1997 |

(Continued)

*Primary Examiner* — Abdullah A Riyami
*Assistant Examiner* — Nader J Alhawamdeh
(74) *Attorney, Agent, or Firm* — RatnerPrestia

(57) ABSTRACT

A land-based electric vehicle charging plug has a plug base and a separate interface, which is secured to the plug base, wherein the plug base has an electrically non-conductive base body and at least one charging current base contact, which is fixedly anchored in the base body. The interface has an electrically non-conductive interface body and at least one corresponding charging current interface contact, which sits in a proximally accessible plug opening in the interface body.

15 Claims, 2 Drawing Sheets

(56) References Cited

FOREIGN PATENT DOCUMENTS

| | | |
|---|---|---|
| DE | 102005013953 A1 | 9/2006 |
| DE | 102012102837 A1 | 10/2012 |
| DE | 102013110798 A1 | 4/2015 |
| DE | 102014000694 A1 | 7/2015 |
| DE | 102014103864 A1 | 9/2015 |
| DE | 102016105470 A1 | 9/2017 |
| DE | 202017105818 U1 | 11/2017 |
| KR | 101370045 B1 | 3/2014 |
| KR | 20170043333 A | 4/2017 |
| WO | 2012169144 A1 | 12/2012 |
| WO | 2015084106 A1 | 6/2015 |

* cited by examiner

LAND-BASED ELECTRIC VEHICLE CHARGING PLUG

CROSS-REFERENCE TO RELATED APPLICATION

This application claims priority to German Patent Application No. DE 10 2018 100 824.4, filed Jan. 16, 2018, which is incorporated by reference herein in its entirety.

FIELD OF THE INVENTION

The invention relates to a land-based electric vehicle charging plug, which can be plugged into a vehicle-based charging plug for the purpose of charging a vehicle-based traction battery.

BACKGROUND OF THE INVENTION

The land-based electric vehicle charging plug is part of a land-based charging station for charging a traction battery of an electric vehicle. In contrast to the vehicle-based charging plug, the land-based charging plug is subjected to a high degree of wear since it is used, that is to say is coupled and decoupled, several hundred times up to several thousand times per year. In addition to pure wear of the electrical contacts, other than that, the charging plug is also mechanically strained and possibly mechanically damaged, for example due to falling and hitting the ground.

The land-based charging plugs are therefore exchanged at regular intervals. This can take place, for example, by virtue of the entire charging cable including the land-based charging plug secured thereto being exchanged. To this end, however, the charging column has to be opened and the new charging cable has to be connected by way of its charging-column-based end to the charging column.

As an alternative, on the land-based charging plug, only the electrical contacts are exchanged. To this end, the corresponding line cables have to be shortened accordingly in order to be able to secure the new electrical contacts to the shortened cable ends, for example by way of soldering or crimping. This method is inconvenient and very susceptible to faulty implementation since the quality of the charging plug overhauled in this way is very dependent on the care taken by the technician.

CN 105896212 A, which is incorporated by reference herein, discloses a land-based electric vehicle charging plug that can be modified to another connection plug standard using an adapter plug. The adapter plug has a plurality of charging current contact pins fixedly anchored in the adapter plug, which charging current contact pins are plugged together when the adapter plug is plugged to the plug base having the corresponding charging current base contacts. The quality of the electrical connection between the adapter-based charging current contact pin and the charging current base contact cannot be controlled and influenced during the plugging-together operation. Under unfavorable circumstances, relatively high transition resistances can result in the contact region between the two contacts, which transition resistances, given charging currents of typically much greater than 100 A, can lead to a critical development of heat.

SUMMARY OF THE INVENTION

Described herein is a land-based electric vehicle charging plug having a simplified exchangeability of the worn parts.

The land-based electric vehicle charging plug according to aspects of the invention has a plug base and a separate exchangeable interface, which is secured to the plug base but can be exchanged with few hand movements. The plug base has an electrically non-conductive base body and at least one charging current base contact, which is fixedly anchored in the base body. The charging current base contact is, for example, cast in the base body in a form-fitting manner.

The interface has an electrically non-conductive interface body and at least one charging current interface contact corresponding to the charging current base contact. The charging current interface contact is not fixedly anchored in the interface body but instead sits in a proximally accessible plug opening in the interface body.

A charging current contact is generally to be understood to mean an electrically conductive contact body via which the charging current flows, by way of which charging current the traction battery of the electric vehicle is charged. The proximal direction is to be understood in the present case to mean the direction that faces toward the charging column, whereas the distal direction is to be understood to mean the opposite direction that faces toward the vehicle-based charging plug.

The charging current interface contact can thus be plugged from the proximal side of the interface body into the plug opening. This makes it possible, after the removal of the worn interface, for the new unworn charging current interface contact initially to be secured to the charging current base contact in a controlled manner and only then for the new unworn interface body to be pushed axially onto the base body in such a way that the charging current interface contact is inserted axially into the plug opening in the process. The charging current interface contact is thus electrically contact-connected to the charging current base contact upstream and in a controlled manner and, where necessary, can be processed and post-processed until the electrical contact-connection is of a sufficient quality. Only thereafter is the non-conductive interface body fitted onto the base body so that the electrical contact-connection is then no longer accessible.

In this way, provision is made for a land-based electric vehicle charging plug whose worn parts, namely, in particular, the interface body and the charging current interface contact or contacts, can be exchanged in a simple manner with relatively little outlay and a high degree of contact quality.

In accordance with a preferred refinement, the plug base of the charging plug has at least one signal base contact, which is fixedly anchored in the base body, wherein the interface has at least one signal interface contact that corresponds thereto and is fixedly anchored in the interface body. The signal interface contact is thus likewise exchanged, but is fixed in the interface body in a fixedly anchored manner such that the corresponding signal base contact is contact-connected only when the interface is plugged onto the plug base.

In the present case, a signal contact is to be understood to mean a contact by way of which the exclusively electrical signals are transmitted between the electric vehicle and the charging station but by means of which the traction battery is not charged.

The charging current base contact preferably has a greater hardness than the charging current interface contact. In the present case, hardness is to be understood to mean the mechanical hardness of the relevant material, that is to say the plastic deformability. The lower mechanical hardness of the charging current interface contact ensures that the charging current base contact is also not considerably deformed or worn after multiple exchanging of worn charging current interface contacts. The deformation of the charging current base contact is minimized both during fixing and during removal of the corresponding charging current interface contact so that multiple exchanging of the charging current interface contact does not lead to a function-restricting deformation of the charging current charging contact either.

In accordance with a preferred refinement, the charging current interface contact has a plastically deformed mounting head at the proximal end thereof, which mounting head sits in a corresponding mounting opening at the distal end of the charging current base contact. The mounting head of the interface contact can be driven into the mounting opening of the corresponding charging current base contact, for example, during mounting so that an extensive contact area between the charging current interface contact to the charging current base contact is produced. This permanently ensures a low transition resistance in this region. When the worn charging current interface contact is removed, it is pulled out of the mounting opening by way of its mounting head, wherein the mounting head is possibly plastically deformed again in order to be able to be pulled out of the mounting opening.

In accordance with a preferred refinement, the charging current interface contact has a mounting head at the proximal end thereof, which mounting head sits in a corresponding mounting opening at the distal end of the charging current base contact. The mounting opening is formed by a slit sleeve. In the present case, a slit sleeve is to be understood to mean a sleeve that is slit substantially in the longitudinal direction and that has a plurality of sleeve arms separated from one another by the sleeve slits, which sleeve arms can be elastically bent in the radial direction in accordance with a preferred refinement. When the mounting head is plugged in, the slit sleeve is elastically deformed so that the undercut mounting head can pass the mounting opening. Nevertheless, after the mounting head has been plugged in, the radial prestress of the sleeve arms ensures that extensive and fixed contact is established, which permanently ensures a low transition resistance.

The plug opening into which the corresponding charging current interface contact is plugged is preferably designed in a slightly conical manner. That is to say the plug opening has a smaller diameter at the opening bottom than at the opening edge. In this way, in particular, the threading of the charging current interface contact into the plug opening when the new interface body is mounted is made easier. In the present case, a slight conicity is to be understood to mean a cone angle of less than 15°.

The plug opening is particularly preferably designed to be free of undercuts with respect to the charging current interface contact so that the charging current interface contact can leave the plug opening again in a non-destructive manner when, for example, the worn interface body is removed from the base body.

In accordance with a preferred refinement of the invention, provision is made for the charging current interface contact to have in the plug opening a radial play of more than 0.2 mm, particularly preferably of more than 0.3 and at most up to 5.0 mm in increments of 0.1 mm. The charging current base contact is particularly preferably anchored in the base body in a manner completely free of play. Owing to the radial play of the interface contact in the plug opening, corresponding inaccuracies during the plugging-together operation are balanced during connection of the land-based charging plug to the corresponding vehicle-based charging plug so that the two charging plugs can be electrically connected to one another in a tension-free manner. This reduces, in particular, the mechanical wear of the charging current contacts of the two charging plugs.

A preferably elastic positioning ring is preferably arranged in the annular intermediate space between the charging current interface contact and the plug opening inner wall, which elastic positioning ring positions the charging current interface contact approximately centrally in the plug opening. In this case, the positioning ring can have a radial thickness that completely radially fills the annular intermediate space so that the charging current interface contact always assumes exactly the same center position in the non-released state.

A securing element is preferably provided, wherein the interface is fixed to the plug base by the securing element in such a way that said securing element can be opened only using a tool. The tool may be a special tool so that unauthorized removal of the securing element is made difficult or is made impossible. A securing element of this kind may be, for example, a lock that can be opened only using a corresponding key.

BRIEF DESCRIPTION OF THE DRAWING

An exemplary embodiment of the invention is explained in more detail in the following text with reference to the drawings. In the drawings.

DETAILED DESCRIPTION OF THE INVENTION

Figure 1:
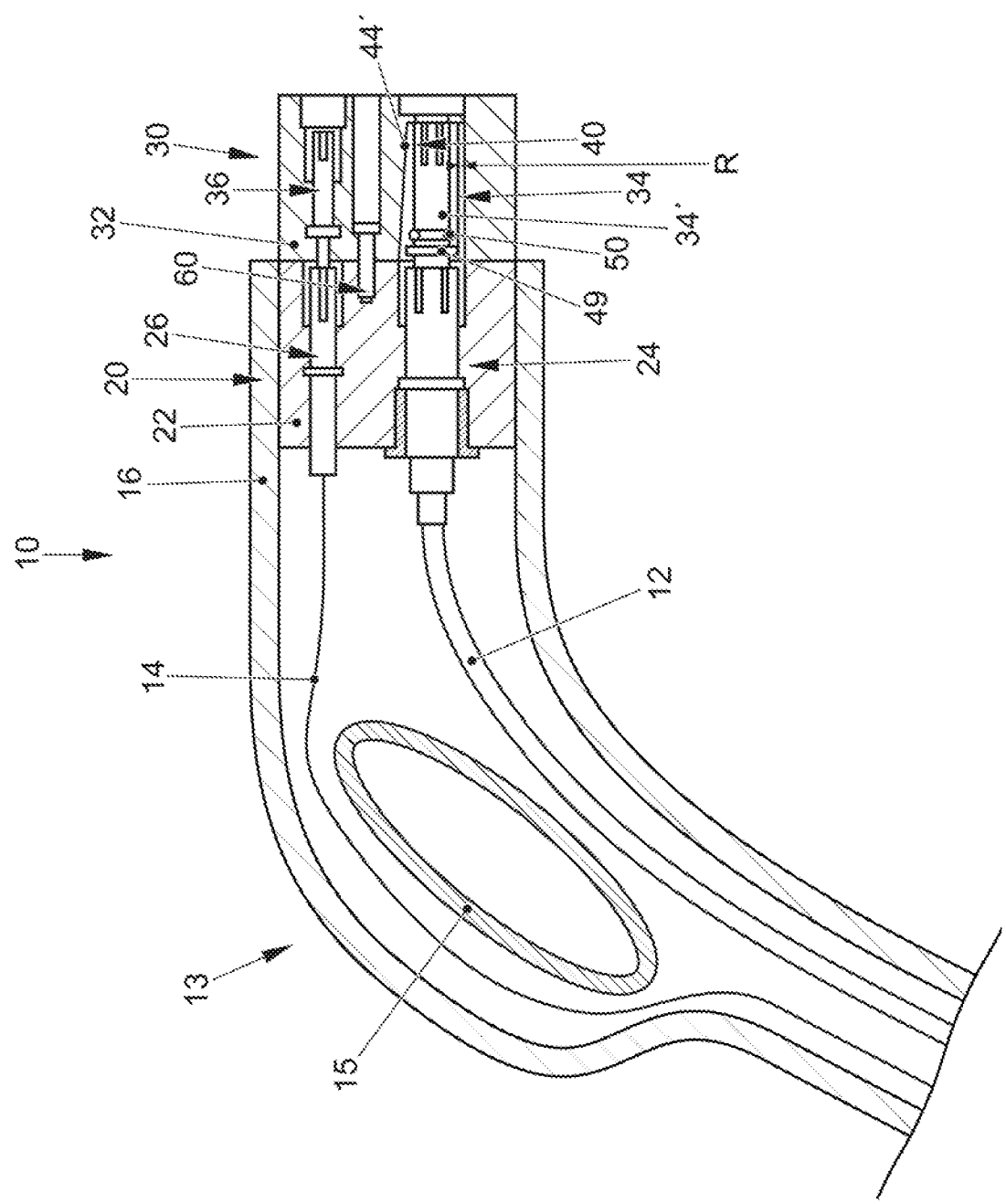
FIG. 1 shows a longitudinal section through a land-based electric vehicle charging plug having a plug base and a mounted interface.
Figure 2:
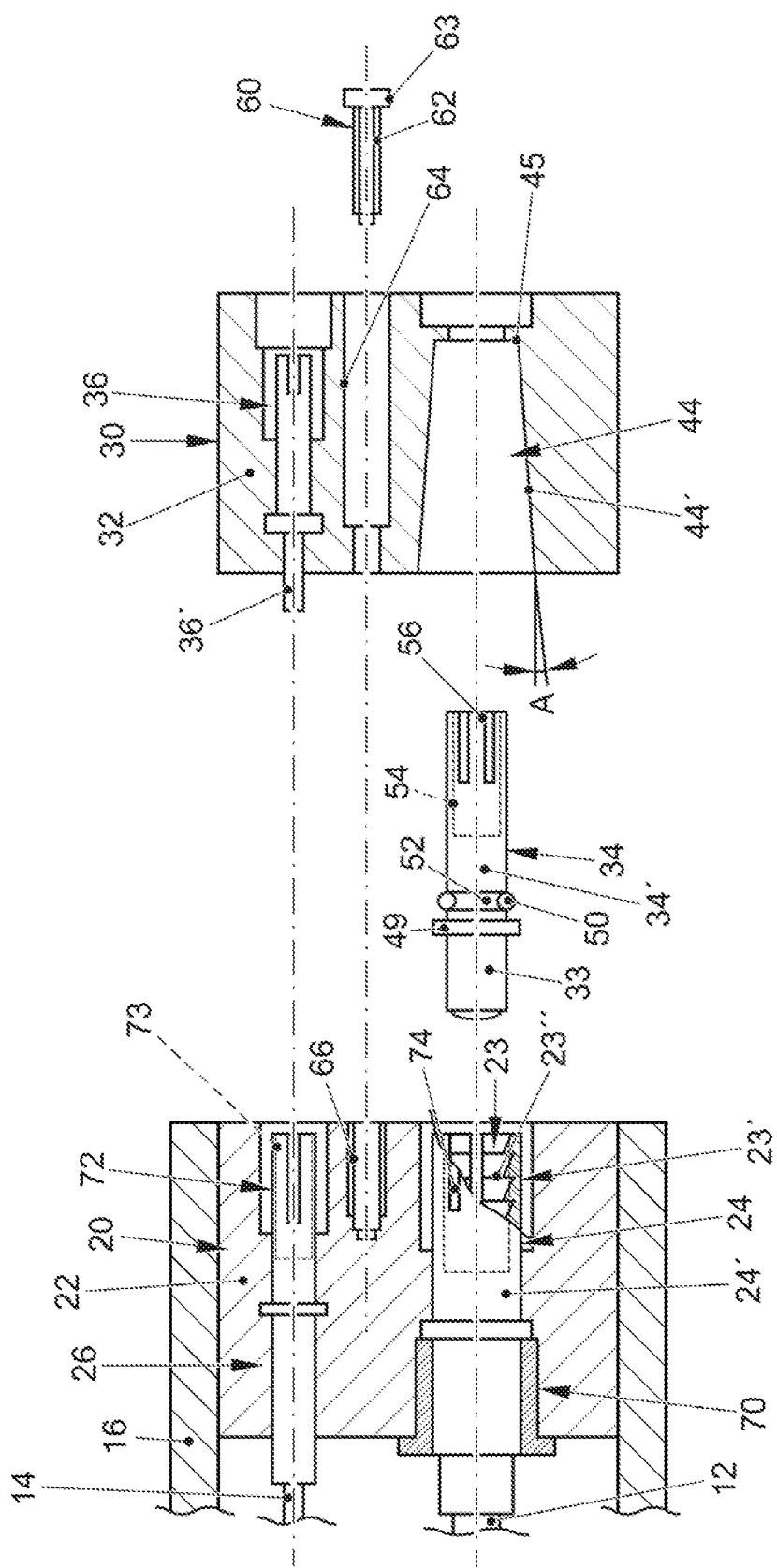
FIG. 2 shows the plug base and the separate and dismantled interface of the electric vehicle charging plug of FIG. 1.

FIG. 1 illustrates a land-based electric vehicle charging plug 10, which is suitable for plugging into a corresponding vehicle-based charging plug (not illustrated) in order to charge a traction battery of an electric vehicle. The charging plug 10 has a handle part 13, which is formed by a handle part housing 16 and defines a handle opening 15, which can be gripped by the hand of an operator.

A plug base 20 is fixedly anchored at the distal end of the handle part housing 16. The plug base 20 is formed by an electrically non-conductive plastic base body 22 and two charging current base contacts 24 fixedly anchored in the base body 22 and a plurality of signal base contacts 26. Each of the figures illustrates a single base contact 24, 26. The base contacts 24, 26 are fixedly anchored in the base body 22 in such a way that they cannot be removed from the base body 22 without damaging or without destroying the base body 22. While the signal base contacts 26 are cast in the base body 22 in a form-fitting and captive manner, the two charging current base contacts 24 are each connected to the base body 22 in a captive manner by means of a corresponding clamping sleeve 70, which may be adhesively bonded to the base body 22, for example.

The plug base 20 remains on the handle part housing 16 over the entire lifetime of the charging plug 10 without being replaced. The charging current base contacts 24 are electrically connected to a land-based charging column (not illustrated) by means of an electrical charging line 12. The signal base contacts 26 are each connected to the land-based charging column by means of an appropriate signal line 14.

Charging currents of several 100 A are transmitted via the charging lines 12. Exclusively electrical signals are transmitted via the signal lines 14.

A separate removable or exchangeable interface 30 is secured to the plug base 20, which interface is subjected to relatively high mechanical wear. The interface 30 can be exchanged with relatively little outlay when required, for example in the context of regular maintenance. The interface 30 has an electrically non-conductive plastic interface body 32, in which two charging current interface contacts 34 are mounted and a plurality of signal interface contacts 36 are fixedly anchored. All of the contacts 24, 26, 34, 36 are electrically conductive and each consist of a metal suitable for this purpose. The two charging current contacts 24, 34 each consist of a metal contact body 24', 34', wherein the contact body 24' of the charging current base contact 24 is mechanically harder than the contact body 34' of the charging current interface contact 34.

The interface 30 or the interface body 32 is fixed to the plug base 20 or the base body 22 by way of a securing element 60. In the present case, the securing element 60 is a head-threaded screw, which is plugged in a deeply recessed manner in a stepped bore 64 of the interface body 32, and which is screwed in a corresponding threaded bore 66 of the base body 22 by way of its threaded shaft 62. The securing element 60 has a screw head 63, which can be contact-connected in a form-fitting manner to a corresponding special tool so that the securing element 60 can be screwed in or out only using the special tool.

In the assembled state, which is illustrated in FIG. 1, a contact head 36' of the signal interface contact 36 plugs in a corresponding contact bore 73 at the distal end 72 of the signal base contact 26.

The charging current interface contact 34 is designed in a substantially cylindrical manner and has at its distal longitudinal end an opening defined by a blind bore 54, into which opening a corresponding contact pin of the vehicle-based charging plug can be plugged. The charging current interface contact 34 has at its proximal end a plastically deformable or deformed mounting head 33, which in the mounted state sits in a corresponding mounting opening 23 at the distal end of the charging current base contact 24. A delimiting ring 49, which limits the radial mobility of the charging current interface contact 34 inside the plug opening 44 of the interface body 32, bears against the mounting head 33 in the distal direction. A circular annular groove 52, in which an elastic positioning ring 50 sits, adjoins the delimiting ring 49, which positioning ring centers the charging current interface contact 34 inside the plug opening 44 when the vehicle-based charging plug is not applied. The charging current interface contact 34 has inside the plug opening 44 a radial play R of approximately 0.5 mm so that the annular gap 48 between the charging current interface contact 34 and the inner wall 44' of the plug opening 44 overall is at least 0.5 mm.

The distal end of the charging current base contact 24 is designed as a slit sleeve 23' having a plurality of sleeve slits 74 running in the axial direction. A plurality of latching rings 23" designed in a sawtooth manner in cross section are provided inside the mounting opening 23. When the mounting head 33 is plugged into the corresponding mounting opening 23, the mounting head 33 is plastically deformed so that it bears extensively against the corresponding surfaces inside the mounting opening 23, as a result of which a very low transition resistance is again realized permanently.

In the assembled state, the charging current interface contact 34 sits in a proximally accessible plug opening 44 of the interface body 32, which is designed in a slightly conical manner, wherein the diameter of said plug opening increases in the proximal direction. The cone angle A between the axial and the inclined inner wall 44' of the plug opening 44 is, for example, 5°. Owing to the slight conicity of the plug opening 44, the threading of the charging current interface contact into the plug opening 44 is made easier.

An annular shoulder 45 is provided at the distal longitudinal end of the plug opening 44, the inner diameter of which annular shoulder is smaller than the outer diameter of the charging current interface contact 34 designed in a substantially cylindrical manner. The annular shoulder 45 supports the charging current interface contact 34 in the mounted state in an axial manner in such a way that a movement of the charging current interface contact 34 in the proximal direction is not possible, for example when the vehicle-based plug charger is removed.

When a new, non-worn interface 30 is mounted on the plug base 20, the charging current interface contact 34 is initially plugged into the mounting opening 23 by way of the mounting head 33 thereof or is driven into said mounting opening using an appropriate tool. In this case, the mounting head 33 is plastically deformed so that it maintains contact fixedly and extensively in the mounting opening 23. Subsequently, the interface body 32 including the signal interface contact 36 fixedly anchored therein is axially fitted onto the base body 22, wherein the contact head 36' of the signal interface contact 36 is plugged into the contact bore 73 and is electrically contact-connected. Finally, the securing element 60 is applied using a special tool so that the interface 30 is finally fixed firmly to the plug base 20.

What is claimed is:
1. A land-based electric vehicle charging plug comprising:
   a handle part including a handle part housing;
   a plug base fixedly anchored to a first distal end of the handle part housing and designed to remain on the handle part housing without being replaced, the plug base having:
      an electrically non-conductive base body,
      at least one charging current base contact for electrical connection to a land-based charging column, which is fixedly anchored in the electrically non-conductive base body, and
      at least one signal base contact that includes a contact bore and is fixedly anchored in the electrically non-conductive base body;
   a separate removable or exchangeable interface secured to the plug base, which is separate from the plug base and secured to the plug base, the separate removable or exchangeable interface including:
      an electrically non-conductive interface body including a proximally accessible plug opening, and
      at least one signal interface contact fixed anchored to the electrically non-conductive interface body and including a contact head to plug into the contact bore of the at least one signal base contact in an assembled state,
   a securing element to fix the separate removable or exchangeable interface to the plug base;
   at least one charging current interface contact designed to sit in the proximally accessible plug opening of the electrically non-conductive interface body.

2. The land-based electric vehicle charging plug as claimed in claim 1, wherein:
   the at least one charging current interface contact further includes a plastically deformable or deformed mounting head at a proximal end, the plastically deformable or deformed mounting head sits in a corresponding mounting opening at a second distal end of the at least one charging current base contact, and the mounting opening is formed by a slit sleeve having a plurality of sleeve slits in an axial direction of the at least one charging current base contact.

3. The land-based electric vehicle charging plug as claimed in claim 1, wherein at least a portion of the proximally accessible plug opening has a conical shape.

4. The land-based electric vehicle charging plug as claimed in claim 1, wherein the proximally accessible plug opening is free of undercuts with respect to the at least one charging current interface contact.

5. The land-based electric vehicle charging plug as claimed in claim 1, wherein the at least one charging current interface contact has, in the proximally accessible plug opening, a radial play of more than 0.2 mm.

6. The land-based electric vehicle charging plug as claimed in claim 1, wherein the at least one charging current interface contact has, in the proximally accessible plug opening, a radial play of from 0.3 mm to 5.0 mm.

7. The land-based electric vehicle charging plug as claimed in claim 1, wherein the at least one charging current interface contact further includes:
 a plastically deformable or deformed mounting head at a proximal end,
 a delimiting ring to limit radial mobility of the charging current interface contact inside the proximally accessible plug opening of the electrically non-conductive interface body and bearing against the plastically deformable or deformed mounting head,
 an elastic positioning ring, and
 a circular annular groove, in which the elastic positioning ring sits and adjoins the delimiting ring to center the at least one charging current interface contact inside the proximally accessible plug opening when the vehicle-based charging plug is not applied.

8. The land-based electric vehicle charging plug as claimed in claim 1, wherein the securing element cannot be opened without tools.

9. The land-based electric vehicle charging plug as claimed in claim 7, wherein the elastic positioning ring is arranged in an annular intermediate space disposed between the at least one charging current interface contact and an inner wall of the proximally accessible plug opening.

10. The land-based electric vehicle charging plug as claimed in claim 1, wherein the electrically non-conductive base body includes a threaded bore.

11. The land-based electric vehicle charging plug as claimed in claim 10, wherein the electrically non-conductive interface body includes a stepped bore.

12. The land-based electric vehicle charging plug as claimed in claim 11, wherein the securing element fixes the separate removable or exchangeable interface to the plug base in the stepped bore of the electrically non-conductive interface body and the threaded bore of the electrically non-conductive base body.

13. The land-based electric vehicle charging plug as claimed in claim 1, wherein separate removable or exchangeable interface is designed to be regularly maintained.

14. The land-based electric vehicle charging plug as claimed in claim 1, wherein the at least one charging current interface contact is mechanically harder than the at least one charging current interface contact.

15. The land-based electric vehicle charging plug as claimed in claim 14, wherein the at least one charging current interface contact includes a blind bore at a second distal end of the at least one charging current interface contact to apply a corresponding contact pin of a vehicle-based charging plug.

\* \* \* \* \*